Aug. 31, 1965　　YOSHIO MASUDA　　3,204,110
OCEAN WAVE ELECTRIC GENERATOR
Filed June 26, 1962　　　　　　　　　　　　2 Sheets-Sheet 2

INVENTOR.
Yoshio Masuda
BY
Michael S. Striker
Atty 3,204,110
OCEAN WAVE ELECTRIC GENERATOR
Yoshio Masuda, 31-1 Kodanjutaku, 540 Ueda,
Hinomachi, Minamitamagun, Tokyo, Japan
Filed June 26, 1962, Ser. No. 205,427
Claims priority, application Japan, July 7, 1961,
36/23,718; Mar. 20, 1962, 37/10,404
7 Claims. (Cl. 290—42)

This invention relates to the ocean wave electric generator which changes the force of ocean waves into electric power.

The object of this invention is to supply electric power to buoys on the ocean which will be available for oceanographic study, meteorological observation, fairway buoy, marine product industry, fishing and military patrol, etc.

Storage batteries have been used for buoys until recently, but as their lives are relatively short, such buoys can not work for a long time without restoring the batteries. By using this ocean wave electric generator in which the electric power is generated by the wave energy, the buoys can be operated semi-permanently as they automatically charge batteries.

There are two different types of the ocean wave electric generator and their constructions are different according to the each application. Type 1 is suitable for small power plant of 1–10 watts and type 2 is suitable for a little larger power plant of 50–500 watts.

Figure 1:
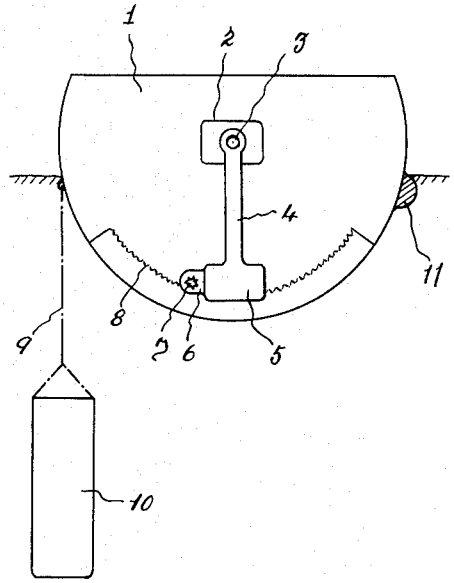
Figure 2:
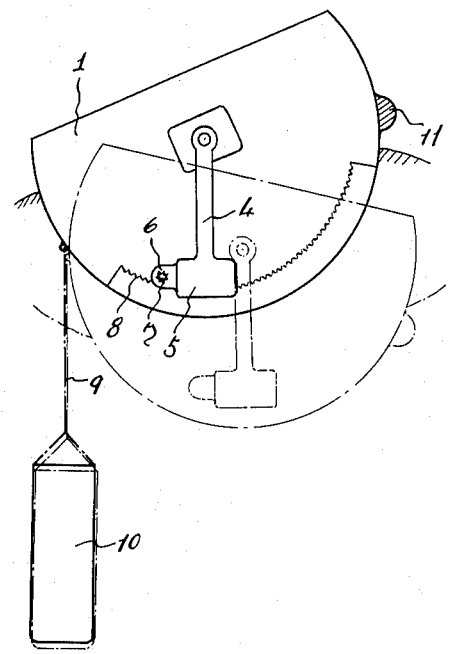
Figure 3:
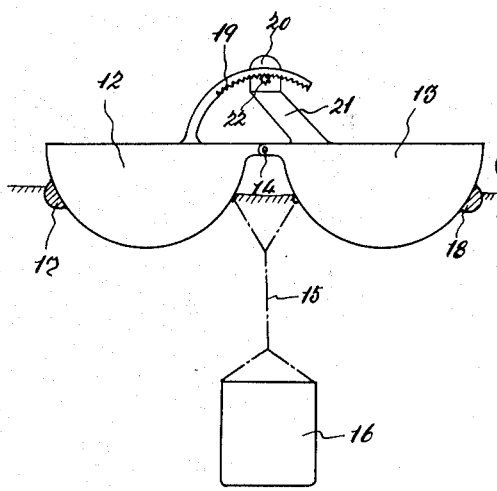
Figure 4:
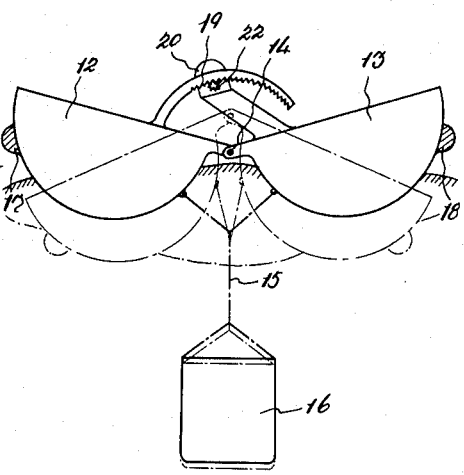
Figure 5:
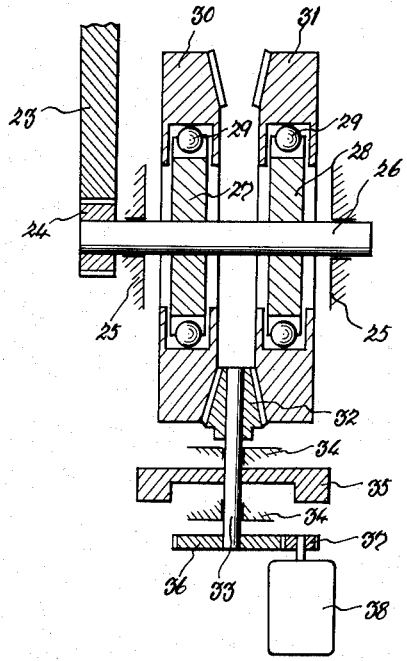
Figure 6:
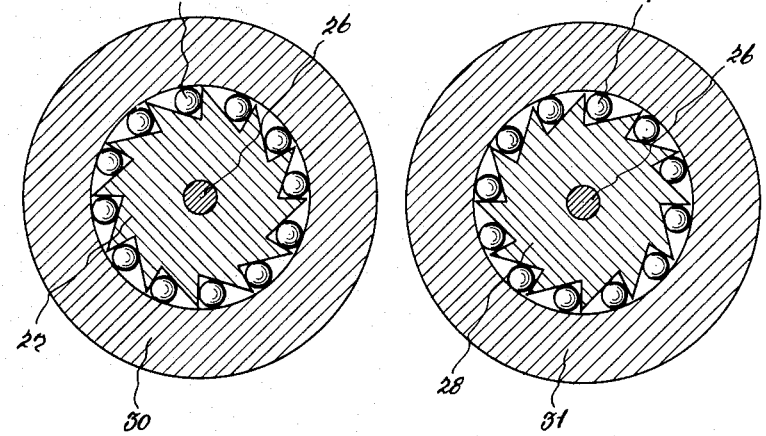

In order that the invention may be understood more clearly and carried into effect readily, embodiments thereof will now be described in detail, by way of example, with reference to the accompanying drawing in which:

FIGURE 1 as a cross sectional side view showing the construction of an ocean wave of electric generator type 1, FIGURE 2 is an explanatory view showing the motion of the ocean wave electric generator of FIGURE 1, FIGURE 3 is a cross sectional side view showing the construction of an ocean wave electric generator type 2, FIGURE 4 is an explanatory view showing the motion of the ocean wave electric generator of FIGURE 3, FIGURE 5 is a partly sectional view of a gear mechanism which is used for this ocean wave electric generator, FIGURE 6 is a cross sectional view of coaster wheels which are used for the above gear mechanism.

A buoy on the ocean is given very strong forces from the water motion of wave. One of the forces is buoyancy from the vertical motion of water surface, and the other is impacting force from the horizontal motion of water, but it is necessary to use an opposite force from the bottom of the sea in order to generate electric power from these forces. In a shallow sea, the opposite force is given by a mooring anchor, but it is very difficult to use the opposite force by the mooring anchor because of tide and very stormy weather. In a deep sea, it is impossible to get the opposite force by the mooring anchor.

This invention offers a solution to these problems. The ocean wave electric generators shown in FIGURES 1 and 3 generate electric power without the opposite force from the bottom of the sea.

The ocean wave electric generator type 1 is suitable for small unit and FIGURE 1 shows the cross sectional side view of its one example. It consists of buoy 1, supporter 2, center shaft 3, arm 4, pendulum weight 5, electric generator 6, small gear 7, large gear 8, wire 9, submerging inertia body 10, and backward weight 11. The submerging inertia body 10 is connected by the wire 9 to one side of the buoy 1, and the backward weight 11 is fixed to the other side of the buoy 1. The weight of the submerging inertia body 10 in the water is the same as that of the backward weight 11, but as the submerging inertia body 10 includes sea water in its body its inertia is very large. The buoy can keep its balance in still water. The center shaft 3 is fixed to the supporter 2 in the buoy 1. The pendulum weight 5 is supported with the arm 4 to the center shaft 3, and the arm 4 can rotate around the center shaft 3. The electric generator 6 is installed in the pendulum weight 5, and its shaft has the small gear 7. The small gear 7 is engaged with the large gear 8 of the buoy 1. Therefore, the rotation of the arm 4 around the center shaft 3 causes a high rotation of the shaft of the electric generator 6 as shown in FIGURE 2 through a gear mechanism which will be explained later.

The buoy 1 moves up and down by the force of buoyancy, but the sumberging inertia body 10 is almost fixed by its large inertia, so the buoy 1 inclines by the wave motion. This phenomenon can be explained by the differences of each force to the buoy 1, the submerging inertia body 10, the backward weight 11, and wave motion.

At first I must explain something about the wave motion. When a wave comes, the vertical position $x$, the vertical velocity $dx/dt$ and the vertical acceleration of wave $d^2x/dt^2$ are shown in the following formulae 1–3.

$$x = H/2 \cdot \sin \omega t \tag{1}$$

$$dx/dt = \pi H/T \cdot \cos \omega t \tag{2}$$

$$d^2x/dt^2 = -2\pi^2 H/T^2 \cdot \sin \omega t \tag{3}$$

in which H is wave height and T is wave period.

The wave energy is transmitted by the force of viscosity between each particle of water, so its vertical force $F_1$ is shown by the Formula 4.

$$F_1 = M \cdot d^2x/dt^2 = -M \cdot 2\pi^2 H/T^2 \cdot \sin \omega t \tag{4}$$

in which M is nearly equal to the mass of water particle.

On the other hand, the buoyancy force $F_2$ to the buoy by the wave is shown by the Formula 5.

$$F_2 = S \cdot x = S \cdot H/2 \cdot \sin \omega t \tag{5}$$

in which S is the horizontal sectional area of the buoy 1. The phase of $F_1$ and $F_2$ is different at 180 degrees.

It is a very important character, that the buoyancy force $F_2$ is given to the center of the buoy 1 and that this force is separated to each board of the buoy; its one part to the submerging inertia body 10 and the other part to the backward weight 11. The mass of the submerging inertia body 10 is much larger than that of the backward weight 11, so the suberging inertia body 10 is sunk into deep position by the wire 9. The wave motion is limitted to the shallow position of sea water, so the submerging inertia body 10 is not influenced by the force $F_1$ but it is influenced by the force $F_2$. As the result, the phase of its motion to wave surface is different about 180 degrees. On the other hand, the mass of the backward weight is small, therefore, the phase of its motion to wave surface comes near to zero degrees difference.

As the result of these phase difference, the buoy is inclined compulsorily and has no relation to free surface of wave. This is a very important phenomenon, because the force which inclines the buoy by free surface of wave is not strong enough to produce a large electric power in a small buoy without the submerging inertia body 10. When the buoy 1 inclines as shown in FIGURE 2, the pendulum weight 5 does not incline, and relative rotation between the pendulum weight 5 and buoy 1 arises. The electric generator is rotated by this relative rotation by the principle mentioned above and it generates electric power. From the latest experiment of this type in which the buoy is about 200 liter, it is confirmed that this type can generate electric power of about 10 watts by a wave of the sea.

The above mentioned mechanism can be installed water tightly in a buoy, so it is prevented from the corrosion of sea water. This type is very suitable for a small electric generator but it is very difficult in this type to get a large electric output, for example more than 100 watts, because the pendulum weight becomes too heavy.

The ocean wave electric generator type 2 which is shown in FIGURES 3 and 4 is suitable for larger output than the type 1. FIGURE 3 shows the cross sectional side view of it. It consists of left buoy 12, right buoy 13, coupler 14, wire 15, submerging inertia body 16, weight 17, weight 18, large gear 19, electric generator 20, base 21 and small gear 22.

The left buoy 12 and the right buoy 13 are connected by the coupler 14, and each buoy can rotate around the coupler 14. The submerging inertia body 16 is connected to inner boards of each buoy 12 and 13 with the wire 15, and the weights 17 and 18 are fixed to outer boards of each buoy 12 and 13.

The submerging inertia body 16 contains sea water in its body and its weight in sea water is the same to the total weight of the weights 17 and 18, so the buoys can keep balance in still water.

The large gear 19 is fixed on the deck of the left buoy 12, and the electric generator 20 is fixed on the deck of the right buoy 13 by the base 21. The small gear 22 engages the large gear 19, and the shaft of the electric generator 20 is connected with the small gear 22 through the gear mechanism which will be explained later.

The shaft of the electric generator 20 rotates by the relative motion of the left buoy 12 to the right buoy 13 around the coupler 14. FIGURE 4 shows the motion of the ocean wave electric generator type 2. The functions and forces of the submerging inertia body and the weight are the same as those of the above mentioned type 1, but in this case the directions of inclination of the left buoy 12 and of the right buoy 13 are opposite to each other, and they cause the relative motion between the left buoy 12 and the right buoy 13 around the coupler 14. Thus, the above relative rotation causes the rotation of the small gear 22 around the large gear 19 and causes electric output by the electric generator 20.

As the above mentioned mechanism has no heavy pendulum, it can be installed on the buoys. The electric output of the ocean wave electric generator increases in proportion of the volume of the buoys and the submerging inertia body, therefore the type 2 is good for large electric output, but it is not good for small electric output because of the complexity of mechanism and other reasons.

FIGURES 5 and 6 show the gear mechanism which is installed between the small gear and the electric generator. The gear mechanism consists of large gear 23 (8 in FIGURE 1 and 19 in FIGURE 3), small gear 24 (7 in FIGURE 1 and 22 in FIGURE 3), bearings 25, 25, first shaft 26, left coaster wheel 27, right coaster wheel 28, balls 29, left bevel gear 30, right bevel gear 31, small bevel gear 32, second shaft 33, bearings 34, 34, flywheel 35, gear 36, gear 37, and electric generator 38.

The rotation of the small gear 24 changes its direction and speed by the character of wave motion, but the rotation of the electric generator is necessary to be constant and high speed. This problem is solved by this gear mechanism which is not complex. When the first shaft 26 turns to right, the left coaster wheel 27 transmits this rotation to the left bevel gear 30 through balls 29, and turns the small bevel gear 32 to right direction. In this case the right coaster wheel 28 is free from this action, so it does not transmit its rotation. When the first shaft turns to left, the right coaster wheel 28 transmits this rotation to the right bevel gear 31, and turns the small bevel gear 34 to right direction. In this case the left coaster wheel 27 is free. As the result, the second shaft 33 turns to the same direction with a geared up speed and rotates the flywheel 35. This rotation is transmitted to the electric generator 38 through gears 36 and 37. The flywheel 35 averages the rotation and the electric generator 38 generates a constant electric output. This electric output is charged to the battery which is installed in the buoy.

This invention may be carried out in other ways or embodied in other forms without departing from the spirit or essential characteristics thereof, the scope of this invention being indicated by the appended claims rather than the foregoing description, and all changes which come within the meaning and range of equivalency in the claims are therefore intended to be embraced therein.

What I claim is:

1. An electric generator actuated by wave motion comprising, in combination, a buoyant body adapted to float in the sea; a submerged inertia body downwardly spaced from said buoyant body; flexible means connecting said submerged inertia body to said buoyant body at one side of the center of gravity of the latter; a counterweight fixed to said buoyant body on the other side of the center of gravity, said inertia body having a volume considerably greater than that of said counterweight and said counterweight and inertia body being connected to said buoyant body to maintain the same in a state of balance when the sea is still, whereby during a wavy sea said buoyant body will tend to move up and down with the waves while said inertia body located below the rising and falling waves will remain substantially at standstill so that said buoyant body will rock about the point at which said flexible means is connected to said buoyant body; rotary electric generator means carried by said buoyant body; and means carried by said buoyant body and operatively connected to said rotary electric generator means to rotate the latter in one direction during rocking of said buoyant body.

2. An electric generator actuated by wave motion comprising, in combination, a buoyant body having opposite side walls and being adapted to float in the sea; a submerged inertia body downwardly spaced from said buoyant body; flexible means connected at one end thereof to said submerged inertia body and at the other end thereof to one of said opposite side walls of said buoyant body at one side of the center of gravity of the latter; a counterweight fixed to the other of said opposite side walls of said buoyant body, said inertia body having a volume considerably greater than that of said counterweight and said counterweight and inertia body having when immersed in the water the same weight and being connected to said side walls of said buoyant body substantially equally spaced from the center of the gravity thereof so as to maintain said buoyant body in a state of balance when the sea is still, whereby during a wavy sea said buoyant body will tend to move up and down with the waves while said inertia body located below the rising and falling waves will remain substantially at standstill so that said buoyant body will rock about the point at which said flexible means is connected to said buoyant body; rotary electric generator means carried by said buoyant body; and means carried by said buoyant body and operatively connected to said rotary electric generator means to rotate the latter in one direction during rocking of said buoyant body.

3. An electric generator actuated by wave motion comprising, in combination, a buoyant body adapted to float in the sea; a submerged inertia body downwardly spaced from said buoyant body; flexible means connecting said submerged inertia body to said buoyant body at one side of the center of gravity of the latter; a counterweight fixed to said buoyant body on the other side of the center of gravity, said inertia body having a volume considerably greater than that of said counterweight and said counterweight and inertia body being connected to said buoyant body to maintain the same in a state of balance when the sea is still, whereby during a wavy sea said buoyant body will tend to move up and down with the waves while said inertia body located below the rising and falling waves will remain substantially at standstill so that said buoyant body will rock about the point at which said flexible means is connected to said buoyant body; a pendulum supported in said buoyant body; an electric generator carried on the free end of said pendulum and having a drive shaft; a large gear carried at the inside of said buoyant body; a small gear carried at the free end of said pendulum and meshing with said large gear; and a gear mechanism between said small gear and said drive shaft of said generator for driving said shaft in one direction and at substantially uniform speed during rocking of said buoyant body and swinging of said pendulum.

4. An electric generator actuated by wave motion comprising, in combination, a buoyant body adapted to float in the sea; a submerged inertia body downwardly spaced from said buoyant body; flexible means connecting said submerged inertia body to said buoyant body at one side of the center of gravity of the latter; a counterweight fixed to said buoyant body on the other side of the center of gravity, said inertia body having a volume considerably greater that that of said counterweight and said counterweight and inertia body being connected to said buoyant body to maintain the same in a state of balance when the sea is still, whereby during a wavy sea said buoyant body will tend to move up and down with the waves while said inertia body located below the rising and falling waves will remain substantially at standstill so that said buoyant body will rock about the point at which said flexible means is connected to said buoyant body; a pendulum supported at one end thereof in said buoyant body for swinging movement about a pivot axis; an electric generator carried on the free end of said pendulum and having a drive shaft; a large arcuate gear carried at the inside of said buoyant body and having its center of curvature at said pivot axis; a small gear carried at the free end of said pendulum and meshing with said large gear; and a gear mechanism between said small gear and said drive shaft of said generator for driving said shaft in one direction and at substantially uniform speed during rocking of said buoyant body and swinging of said pendulum.

5. An electric generator actuated by wave motion comprising, in combination, two buoyant bodies arranged adjacent each other and coupled to each other for tilting movement with respect to each other about a pivot axis, said buoyant bodies adapted to float in the sea; a submerged inertia body downwardly spaced from said buoyant bodies; flexible means connecting said submerged inertia body to each of said buoyant bodies at one side of the center of gravity of each body; a counterweight fixed to each buoyant body on the other side of the center of gravity thereof, said inertia body having a volume considerably greater than that of each of the counterweights and said counterweights and inertia body being connected to said buoyant bodies to maintain the latter in a state of balance when the sea is still, whereby during a wavy sea said buoyant bodies will tend to move up and down with the waves while said inertia body located below the rising and falling waves will remain substantially at standstill so that said buoyant bodies will rock about said tilting axis; and electric generator mounted on one of said buoyant bodies and having a drive shaft; a large gear carried by the other of said buoyant bodies; a small gear meshing with said large gear and mounted on said one buoyant body; and gear means connecting said small gear to said drive shaft for driving the latter during rocking of said buoyant bodies about said pivot axis.

6. An electric generator actuated by wave motion comprising, in combination, two buoyant bodies arranged adjacent each other and coupled to each other at adjacent upper portions thereof for tilting movement with respect to each other about a pivot axis, said buoyant bodies adapted to float in the sea; a submerged inertia body located downwardly spaced from said buoyant bodies beneath said pivot axis; flexible means connecting said submerged inertia body to each of said buoyant bodies at facing side wall portions thereof; a counterweight fixed to each buoyant body at the other side wall portion thereof, said inertia body having a volume considerably greater than that of each of the counterweights and said counterweights and inertia body being connected to said buoyant bodies to maintain the latter in a state of balance when the sea is still, whereby during a wavy sea buoyant bodies will tend to move up and down with the waves while said inertia body located below the rising and falling waves will remain substantially at standstill so that said buoyant bodies will rock about said tilting axis; an electric generator mounted on one of said buoyant bodies and having a drive shaft; a large gear carried by the other of said buoyant bodies; a small gear meshing with said large gear and mounted on said one buoyant body; and gear means connecting said small gear to said drive shaft for driving the latter during rocking of said buoyant bodies about said pivot axis.

7. An electric generator actuated by wave motion comprising, in combination, two buoyant bodies arranged adjacent each other and coupled to each other at adjacent upper portions thereof for tilting movement with respect to each other about a pivot axis, said buoyant bodies adapted to float in the sea; a submerged inertia body located downwardly spaced from said buoyant bodies beneath said pivot axis; flexible means connecting said submerged inertia body to each of said buoyant bodies at facing side wall portions thereof; a counterweight fixed to each buoyant body at the other side wall portion thereof, said inertia body having a volume considerably greater than that of each of the counterweights and said counterweigths and inertia body being connected to said buoyant bodies to maintain the latter in a state of balance when the sea is still, whereby during a wavy sea said buoyant bodies will tend to move up and down with the waves while said inertia body located below the rising and falling waves will remain substantially at standstill so that said buoyant bodies will rock about said tilting axis; an electric generator mounted on one of said buoyant bodies and having a drive shaft; a large arcuate gear carried by the other of said buoyant bodies and having a center of curvature at said pivot axis and extending upwardly from said other buoyant body toward said one buoyant body; a small gear meshing with said large gear and mounted on said one buoyant body; and gear means connecting said small gear to said drive shaft for driving the latter during rocking of said buoyant bodies about said pivot axis.

References Cited by the Examiner

UNITED STATES PATENTS

| 472,398 | 4/92 | Rosenholz | 290—53 |
| 908,316 | 12/08 | Nutt | 253—6 |
| 2,296,385 | 9/42 | Haynes | 74—812 |

FOREIGN PATENTS

| 297,720 | 9/28 | Great Britain. |

O. L. RADER, *Primary Examiner.*